United States Patent [19]
Kanemoto et al.

[11] Patent Number: 5,623,353
[45] Date of Patent: Apr. 22, 1997

[54] COLOR LIQUID CRYSTAL DEVICE HAVING THICKNESS CONTROLLING LAYERS DISPOSED AT PIXEL PORTIONS

[75] Inventors: Akihiko Kanemoto, Yokohama; Yasuyuki Takiguchi, Kawasaki, both of Japan

[73] Assignee: Ricoh Company, Ltd., Tokyo, Japan

[21] Appl. No.: 443,159

[22] Filed: May 17, 1995

Related U.S. Application Data

[62] Division of Ser. No. 168,402, Dec. 17, 1993, Pat. No. 5,493,429, which is a continuation of Ser. No. 766,133, Sep. 27, 1991, abandoned.

[30] Foreign Application Priority Data

Oct. 26, 1990 [JP] Japan .................. 2-290218

[51] Int. Cl.⁶ .................................. G02F 1/1333
[52] U.S. Cl. .................................. 349/122; 349/106
[58] Field of Search .................. 359/67, 73, 68, 359/74, 79, 54, 62, 66, 82, 93, 891; 345/88

[56] References Cited

U.S. PATENT DOCUMENTS

| | | |
|---|---|---|
| 4,597,637 | 7/1986 | Ohta et al. . |
| 4,632,514 | 12/1986 | Ogawa et al. . |
| 4,776,675 | 10/1988 | Takaochi et al. . |
| 4,818,074 | 4/1989 | Yokoi et al. . |
| 4,830,941 | 5/1989 | Roosen et al. . |
| 4,917,471 | 4/1990 | Takao et al. . |
| 4,921,728 | 5/1990 | Takiguchi et al. . |
| 4,929,060 | 5/1990 | Sugimoto et al. . |
| 4,946,259 | 8/1990 | Matino et al. . |
| 4,984,873 | 1/1991 | Takiguchi et al. . |
| 5,056,896 | 10/1991 | Iimura et al. . |
| 5,064,697 | 11/1991 | Takiguchi et al. . |
| 5,093,738 | 3/1992 | Watanabe et al. . |
| 5,124,818 | 6/1992 | Conner et al. . |
| 5,132,816 | 7/1992 | Itoh et al. . |
| 5,150,237 | 9/1992 | Iimura et al. . |
| 5,184,237 | 2/1993 | Iimura et al. . |
| 5,194,976 | 3/1993 | Nakano et al. . |
| 5,250,214 | 10/1993 | Kanemoto et al. . |
| 5,380,459 | 1/1995 | Kanemoto et al. . |

FOREIGN PATENT DOCUMENTS

| | | | |
|---|---|---|---|
| 60-159827 | 8/1985 | Japan | 359/68 |
| 60-159830 | 8/1985 | Japan | 359/68 |
| 60-159831 | 8/1985 | Japan | 359/68 |
| 61-112129 | 5/1986 | Japan . | |
| 62-28715 | 2/1987 | Japan . | |
| 62-115420 | 5/1987 | Japan | 359/68 |
| 62-141517 | 6/1987 | Japan . | |
| 62-247330 | 10/1987 | Japan . | |
| 62-267723 | 11/1987 | Japan . | |
| 63-48520 | 3/1988 | Japan | 359/68 |
| 1-147430 | 6/1989 | Japan . | |
| 2-29620 | 1/1990 | Japan . | |
| 3-2826 | 1/1991 | Japan . | |

*Primary Examiner*—William L. Sikes
*Assistant Examiner*—Tai V. Duong
*Attorney, Agent, or Firm*—Oblon, Spivak, McClelland, Maier & Neustadt, P.C.

[57] ABSTRACT

A color liquid crystal device comprises a pair of transparent substrates opposing to each other and having electrodes respectively, a plurality of color filters disposed on an inner surface of one of the substrates, a liquid crystal layer disposed between the substrates, a pair of electrodes disposed on the substrates respectively for applying an electric field to the liquid crystal layer thereby to vary a state of molecular orientation of said liquid crystal layer to perform a light modulation. A thickness of the liquid crystal layer is decreased or increased at an overlapping portion of the color filters than the rest portion of the color filters.

6 Claims, 2 Drawing Sheets

COLOR LIQUID CRYSTAL DEVICE HAVING THICKNESS CONTROLLING LAYERS DISPOSED AT PIXEL PORTIONS

This is a Division of application Ser. No. 08/168,402, filed on Dec. 17, 1993, now U.S. Pat. No. 5,493,429, which is a Continuation of application Ser. No. 07/766,133, filed on Sep. 27, 1991, now abandoned.

BACKGROUND OF THE INVENTION

1. Field of the Invention

The present invention relates to a color LCD (liquid crystal device), particularly to color liquid crystal device which prevents light from leaking in places between color picture elements of the color LCD (liquid crystal device).

2. Description of the Related Art

A color display device based on the liquid crystal has picture elements of a matrix type liquid crystal cell, each picture element having fine color filters consisting of three primary colors, that is, red (R), green (G), and blue (B). The color display device performs color display by mixing the color components visually.

It is necessary to manufacture the picture elements in a highly refined manner for improving the color resolution, however, the more refined the picture element is, the more the color bleeding and light leaking tend to occur in the places between picture elements adjacent to one another, thus deteriorating the image quality. To deal with this, a light blocking layer called a "black matrix" has been provided, which blocks light from proceeding through the places between adjacent picture elements, to avoid the deterioration of the image quality. The black matrix is formed by evaporating chromium or effecting a black photoresist, though materials suitable for forming the black matrix are extremely limited considering the performance and reliability of tackiness to the substrate of liquid crystal or the color filter. For instance, in a case where a polymer film of such as a synthesized resin is used for the substrate, chromium evaporation can not be adopted to form a black matrix due to the lack of tackiness or due to the outbreak of curvature caused by the differential thermal expansion between the black matrix and the substrate with a change of the environmental temperature. On the other hand, in a case where the photoresist is adopted to form a black matrix, the choice of material suitable for this is limited due to the lack of heat resistance, or due to the change in quality being effected by the solvent for use therein.

To avoid this, there has been proposed a method of performing a blocking effect, neither by the evaporation nor black photoresist of the black matrix, but by overlapping color filters, which constitute picture elements, in the peripheries of the color picture elements to mix colors.

SUMMARY OF THE INVENTION

This invention has been accomplished in view of what is discussed above, and it is therefore an object of the present invention to provide a highly fine color liquid crystal display in which, in order to perform the same effect to be produced by using a black matrix without forming any black matrix, the thickness of the layer of liquid crystal needed to be blocked is controlled so as to give a change to the thickness of the liquid crystal, whereby to cause linearly polarized light passing through the liquid crystal to differ in phase between the layers to be blocked and not to be blocked, thus reducing the transmitted quantity of light in the places to be blocked and preventing superfluous light from leaking.

The object of the invention can be achieved by a first liquid crystal device comprising: a pair of transparent substrates opposing each other and having electrodes respectively; a plurality of color filters disposed on an inner surface of one of the substrates, the color filters overlapping with one another at respective edges; a liquid crystal layer disposed between the substrates; a pair of electrodes disposed on the substrates respectively for applying an electric field to the liquid crystal layer thereby to vary a state of molecular orientation of the liquid crystal layer to perform a light modulation; and a pair of polarizers disposed so as to sandwich the liquid crystal layer and the color filters, a thickness of the liquid crystal layer being decreased at an overlapping portion of the color filters relative to the remaining portion of the color filters.

According to the first color liquid crystal device, since the thickness of the layer of liquid crystal is controlled thereby to prevent light from leaking in that portion, a highly clear color LCD (liquid crystal device) can be provided by a simple method. In addition, the color LCD can be provided by only forming color filters on the substrate, thus enabling the process to be remarkably simplified.

The object of the present invention can be also achieved by a second liquid crystal device comprising: a pair of transparent substrates opposing each other and having electrodes respectively; a plurality of color filters disposed on an inner surface of one of the substrates, the color filters being spaced from one another; a liquid crystal layer disposed between the substrates; a pair of electrodes disposed on the substrates respectively for applying an electric filed to the liquid crystal layer thereby to vary a state of molecular orientation of the liquid crystal layer to perform a light modulation; a pair of polarizers disposed so as to sandwich the liquid crystal layer and the color filters; and a thickness controlling layer disposed inside said color filters for decreasing a thickness of the liquid control layer.

According to the second color liquid crystal layer, there is provided a thickness controlling layer at the portion needed to be blocked or at the display portion, so that controlling the thickness of the controlling layer prevents light from leaking at that portion, thus making it possible to provide a highly clear color LCD (liquid crystal device) having an excellent reliability.

In these aforementioned color liquid crystal devices, it is possible to form color filters on the polymer film.

When the substrate is formed of a polymer film, this affords wide variations for the materials of the thickness controlling layer to be selected. Thus the wide variations of choice of materials for the blocking layer increase reliability.

Further objects and advantages of the present invention will be apparent from the following description of the preferred embodiments of the invention as illustrated in the accompanying drawings.

DESCRIPTION OF THE PREFERRED EMBODIMENTS

The present invention will be further detailed based on the embodiments described below.

Figure 1:
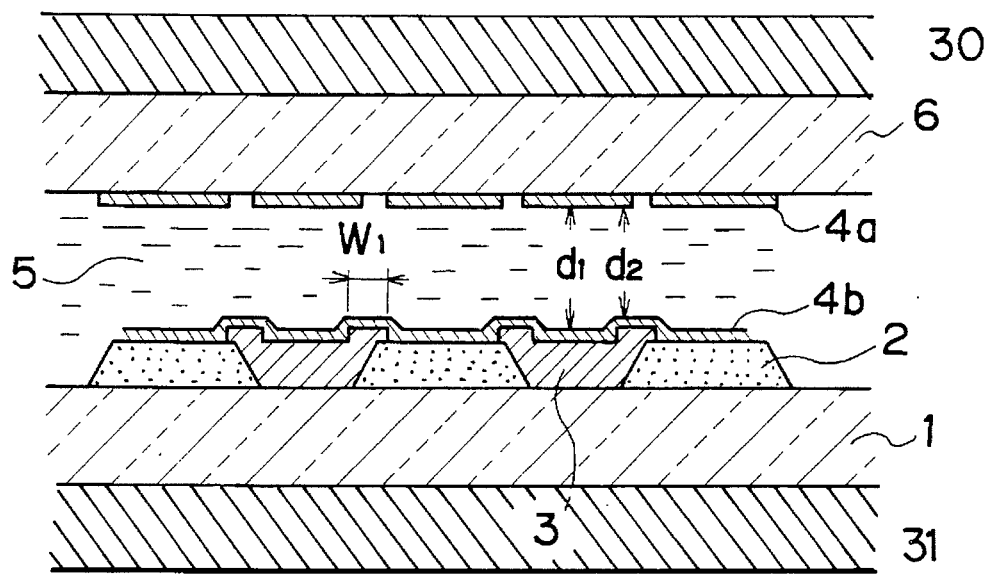
FIG. 1 is a constructional view for illustrating an embodiment of the color liquid crystal device according to the present invention.

FIG. 1 is a constructional view for illustrating an embodiment of the color liquid crystal device of the present invention. In this figure, there are provided a pair of substrates 1 and 6, A-color filters 2, B-color filters 3, transparent electrically conductive films 4a and 4b, and a liquid crystal layer 5.

In this figure, the substrates 1 and 6 each consist of a transparent flat plate such as a glass or a polymer (polymerized material such as synthesized resin). On the substrate 1 there are formed, with a small-size, an A-color filter 2 and a B-color filters 3 each of which has the same thickness and a different color one from another to constitute color picture elements.

The A-color filter 2 is disposed in contact with the B-color filter 3 at an angle, or with the boundary therebetween being inclined, to the normal of the surface of the substrate 1, so that there is provided an overlapping portion w1 between the A-color filter 2 and the B-color filter 3. In the overlapping portion w1, there is a protrusion having a thickness more than that of the portions other than the overlapping portion of the A-color filter and B-color filter. In this figure, the protrusions are disposed at the edges of the B-color filters 3. Note that in the case where there are engaged three primary colors, another primary-colored filter should be added, although is not shown here. In this case, there are also provided overlapping portions at edges of the primary-color filters of picture elements to increase the overlapping portions in thickness.

Color filters of red (R), green (G) and blue (B) are formed, for example, on the glass substrate 1 by the printing method so that the color filters are laid to overlap each other at edges, thus providing overlapping portions w1 as shown in FIG. 1. According to the measurement made by the present inventor, the overlapping portion w1 is larger in thickness by 1.0 to 2.0 micrometers (μm) than the other portions.

The surfaces of the A-color filter 2 and the B-color filter 3 are totally coated by a common electrode with a transparent electrically conductive film 4b consisting of such as ITO (Indium Tin Oxide) by evaporation or the other method. Also the substrate 6 has a transparent electrically conductive film (ITO) 4a formed thereon which is located in contact with the liquid crystal layer 5 and driven by every picture element facing the filter 2 or 3.

The thickness d1 of the layer of liquid crystal in the overlapping portion is smaller than the thickness d in the other portion by the thickness of the overlapping portion w1 of the A-color filter 2. Here, when the anisotropy in refractive index is represented by $\Delta n$, the retardations in phase of the respective portions are expressed by:

$\Delta n d_1$ for the overlapping portion of the filters 2 and 3 . . . (1)

$\Delta n d$ for the portion other than the overlapping portion of the filters 2 and 3 . . . (2).

The relation between the retardation in phase and the transmittance of LCD (liquid crystal device) depends on the mode of the LCD (liquid crystal device), and specifically, depends on various kinds of electro-optical effects induced by the orientation effect of the liquid crystal molecules based on the dielectric anisotropy of liquid crystal, as well as on parameters of the liquid crystal cell having this dielectric anisotropy. However, in general, it is possible to minimize the transmittance when the retardation in phase being $\Delta n d_1$, to thereby enable the overlapping portion to have the same light-blocking property as the black matrix would. When the protrusion formed by the overlapping portion of the A-color filter and B-color filter is too large in thickness, the thickness can be adjusted by forming a film for a smoothing layer composed of a transparent resin or the like after forming the color filters.

Note that there should be disposed on the outer surfaces of the substrates 1 and 6, a pair of polarizers 30 and 31 which comprise a orientation etc., and hold the layer of liquid crystal therebetween, as are shown in FIG. 1.

Figure 2:
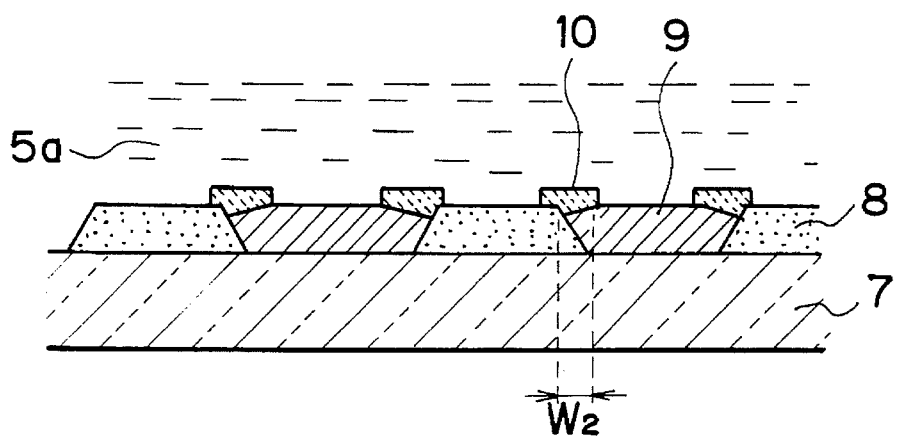
FIGS. 2, 3 and 4 are constructional views for illustrating other embodiments of the color liquid crystal device according to the present invention.

FIG. 2 is a constructional view for illustrating another embodiment of the present invention. In the figure, there are provided a substrate 7, an A-color filter 8, a B-color filter 9, a thickness controlling layer 10, and a liquid crystal layer 5a. In the figure, there is shown the case in which the A-color filter is disposed in contact with the B-color filter without keeping any space, to form an overlapping portion w2, and the thickness controlling layer 10 is made to have a larger width than the overlapping portion w2. The thickness controlling layer 10 is to produce a retardation in phase in proportion to the thickness of the thickness controlling layer 10, to thereby decrease the transmittance in the range of the width of the thickness controlling layer 10.

Note that a transparent electrically conductive film (ITO), another substrate facing the substrate 7 and a polarizer are not shown in FIG. 2.

Figure 3:
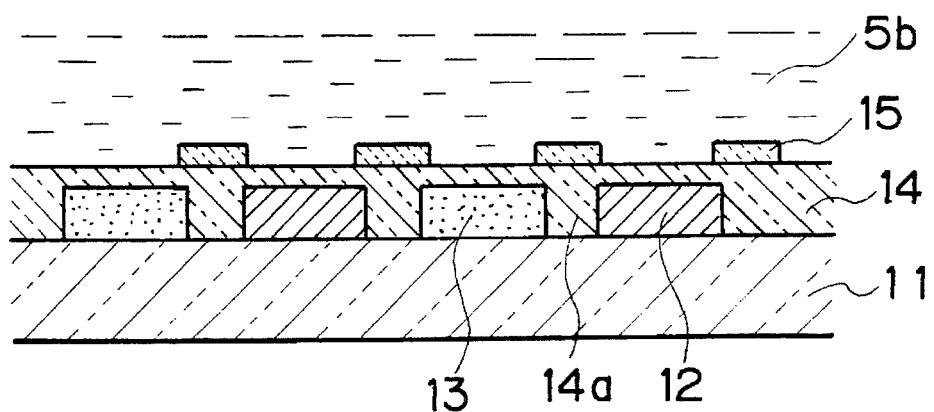

FIG. 3 is a constructional view for illustrating a further embodiment of the present invention. In the figure, there are provided a substrate 11, an A-color filter 12, a B-color filter 13, a smoothing layer 14, a clearance portion 14a, a thickness controlling layer 15 and a liquid crystal layer 5b.

In the figure, the A-color filter 12 and the B-color filter 13 are formed apart on the substrate 11, to be coated with the smoothing layer 14 consisting of a transparent resin etc.

More specifically, three primary-color filters, (shown as A- and B-color filters 12, 13 in the figure), the red (R), green (G) and blue (B) filters constituting picture elements are disposed on the substrate 11 made of such as glass, and thereafter to be smoothly spin-coated with the smoothing layer 14. In relation to the arrangement pattern of the color filters such as A- and B-color filters 12 and 13, there are provided clearance portions 14a between picture elements adjacent to one another as shown in the figure, and consequently the clearance portion 14a forms an optical clearance.

On the surface of the smoothing layer 14, there are formed thickness controlling layers 15 at the portions corresponding to the clearance portions 14a to give the layer of liquid crystal 5b a retardation in phase in proportion to the thickness of the thickness controlling layer 15, thus making it possible to decrease the transmittance in the ranges of the width of the thickness controlling layer 15.

The thickness controlling layers 15 are formed onto the smoothing layer 14 by spin-coating the positive photo-resist, and irradiating ultraviolet rays from the rear side of the substrate 11 onto the filter clearance portions 14a to be exposed. The thickness of the thus formed by the structure resist pattern was measured with a tracer type film thickness sensor to be about 800 Å.

Accordingly, the thickness controlling layer 15 is no longer necessarily dark-colored as used to be in the conventional black matrix in order to effect color-absorption, and may even be transparent.

Note that an electrically conductive transparent film (ITO), another substrate facing the substrate 11 and a polarizer are not shown in FIG. 3.

Figure 4:
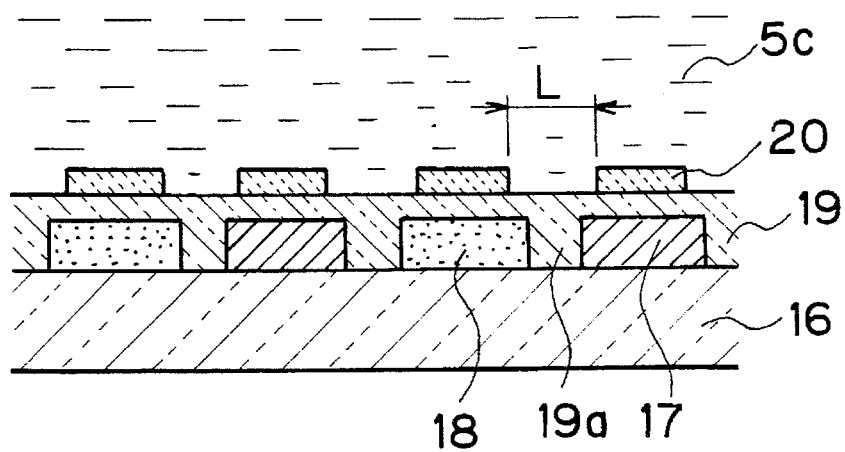

FIG. 4 is a constructional view for illustrating a still further embodiment of the present invention. In the figure, there are provided a substrate 16, an A-color filter 17, a B-color filter 18, a smoothing layer 19, a clearance portion 19a, a thickness controlling layer 20, a liquid crystal layer 5c. In the figure, the A-color filters 17 and B-color filters 18 are separately disposed on the substrate 16 to be coated with the smoothing layer 19 consisting of a transparent resin, and etc. Accordingly, there are clearance portions 19a between separately formed color filters in the smoothing layer 19. The interval L between the thickness controlling layers 20 is larger than the width of the clearance portion 19a. Since each thickness controlling layer 20 is disposed facing the A-color filter 17 or the B-color filter 18, the thickness of the layer of liquid crystal in this portion is made to be thinner by the thickness of the disposed thickness controlling layer 20. Consequently, the interval L needed to be blocked has a larger retardation in phase in the layer of liquid crystal than the portion where the thickness controlling layer 20 is disposed. Since the thickness controlling layer 20 is disposed on the picture-element color filter, it need be transparent or have a similar color of the color filter underneath.

In the embodiments described heretofore, the color filters are formed on a glass substrate by a printing method. In place of the glass substrate, if a polymer film is engaged as the substrate, the substrate can be made to have nearly an equal expansion coefficient as the material of the color filter. This affords a thermal stability suppressing occurrence of deformation. In addition, since the smoothing layer and the thickness controlling layer can be made from the same polymer, there is given a wide variation of selection of the materials for the blocking layer, thus making it possible to provide a color LCD (liquid crystal device) at a low cost with high reliability and stability.

Note that a transparent electrically-conductive film (ITO), another substrate facing the substrate 14 and a polarizer are not shown in FIG. 4.

In relation to the mode of the LCD (liquid crystal device) referred to heretofore, any liquid crystal can be used as long as it exhibits electro-optical effect such as TN (Twisted Nematics), STN (Super Twisted Nematics), ECB (Electrically Controlled Birefringence), DAP (Deformation of Vertically Aligned Nematics) or etc., and it can perform optical modulation by varying the extent of the retardation in phase in time with the electric field being charged.

What is claimed is:

1. A color liquid crystal device, comprising:

a pair of polarizers opposed to each other and spaced apart from each other;

a pair of transparent substrates disposed on an inner surface of each of said polarizers so as to be opposed to each other;

a liquid crystal layer disposed between said substrates;

a plurality of first color filters disposed on an inner surface of one of said substrates and spaced apart from each other;

a plurality of second color filters each disposed between two of said first color filters adjacent to each other such that each of said second color filters is spaced apart from each of said two adjacent first color filters;

thickness controlling layers each disposed so as to project from a surface of said first and second color filters facing said liquid crystal layer into said liquid crystal layer and to produce a difference in magnitudes of retardation in phase between a portion of said liquid crystal layer constituting a non-pixel portion and another portion of said liquid crystal layer constituting a pixel portion, said non-pixel portion corresponding to each of regions between said first and second color filters, said pixel portion corresponding to each of said first and second color filters, to thereby make a transmittance of said non-pixel portion smaller than that of said pixel portion; and a pair of electrodes, one of which is disposed on said first and second color filters and said thickness controlling layers and the other of which is disposed on an inner surface of the other of said substrates, for applying an electric field to said liquid crystal layer thereby to vary a state of molecular orientation of said liquid crystal layer to perform a light modulation, said thickness controlling layers being each disposed on said first and second color filters.

2. A color liquid crystal device according to claim 1, wherein said substrate comprises a polymer film.

3. A color liquid crystal device according to claim 1, further comprising a smoothing layer formed between the thickness controlling layers and the first and second color filters.

4. A color liquid crystal device, comprising:

a pair of polarizers opposed to each other and spaced apart from each other;

a pair of transparent substrates disposed on an inner surface of each of said polarizers so as to be opposed to each other;

a liquid crystal layer disposed between said substrates;

a plurality of first color filters disposed on an inner surface of one of said substrates and spaced apart from each other;

a plurality of second color filters each disposed between two of said first color filters adjacent to each other;

thickness controlling means disposed so as to project from a surface of said first and second color filters facing said liquid crystal layer into said liquid crystal layer and for producing a difference in magnitudes of retardation in phase between portions of said liquid crystal layer constituting non-pixel portions and portions of said liquid crystal layer constituting pixel portions, to thereby make a transmittance of said non-pixel portions smaller than that of said pixel portions; and a pair of electrodes, one of which is disposed on said first and second color filters and said thickness controlling means and the other of which is disposed on an inner surface of the other of said substrates, for applying an electric field to said liquid crystal layer thereby to vary a state of molecular orientation of said liquid crystal layer to perform a light modulation, said thickness controlling means comprising thickness controlling layers disposed on said first and second color filters.

5. A color liquid crystal device according to claim 4, wherein said substrate comprises a polymer film.

6. A color liquid crystal device according to claim 4, further comprising a smoothing layer formed between the thickness controlling layers and the first and second color filters.

* * * * *